Oct. 5, 1954
R. V. LOWMAN
TRANSISTOR SYSTEM FOR TRANSLATING SIGNALS IN TWO DIRECTIONS
Filed July 18, 1952
2,691,073
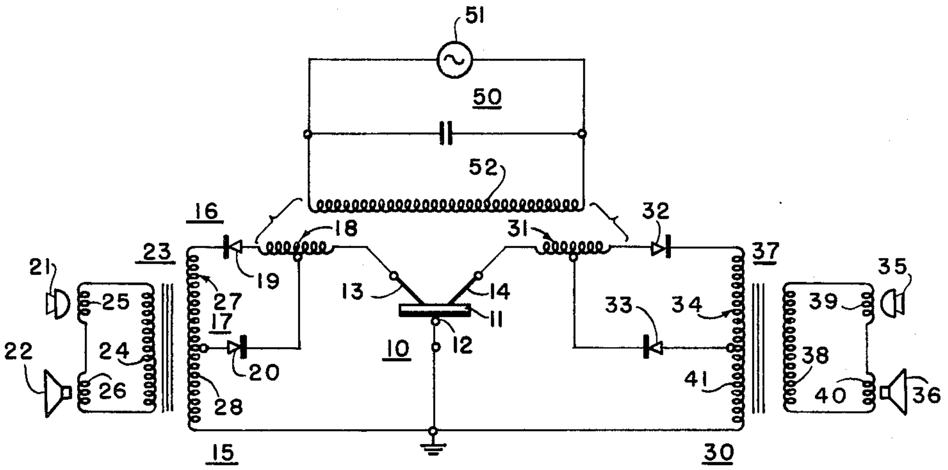
INVENTOR.
RODERIC V. LOWMAN
BY Laurence B. Dodds
ATTORNEY Patented Oct. 5, 1954 2,691,073

UNITED STATES PATENT OFFICE 2,691,073

TRANSISTOR SYSTEM FOR TRANSLATING SIGNALS IN TWO DIRECTIONS

Roderic V. Lowman, Westbury, N. Y., assignor to Hazeltine Research, Inc., Chicago, Ill., a corporation of Illinois Application July 18, 1952, Serial No. 299,598

13 Claims. (Cl. 179—170)

*General*

The present invention is directed to systems for translating signals in two directions. More particularly, the invention relates to two-way signal-translating systems employing transistors as amplifying elements in the signal-translating channels thereof. While systems in accordance with the present invention are adapted to translate both high-frequency and low-frequency information in two directions between two terminal points, the invention will be described in the environment of a system for translating low-frequency or audio-frequency information in two directions between those points.

The use of transistors in both electronic devices and systems is being given widespread attention by equipment designers because of their very small size, lightness of weight, ruggedness, long operating life, extremely simple power requirements, and zero warm-up time. It would therefore seem that their use in two-way communication systems is extremely desirable.

It is an object of the invention, therefore, to provide a new and improved two-way communication system which employs a transistor as a two-way repeater element thereof for translating information in opposite directions through the transistor.

It is another object of the invention to provide a new and improved system for translating signals in two directions which is simple in construction and is effective efficiently to transfer information from one terminal point to another.

It is another object of the invention to provide a new and improved two-way communication system which is economical of power, requires no push-button or switching controls, and is adapted to use a transistor of either the point-contact or the junction type.

In accordance with a particular form of the invention, a system for translating signals in two directions comprises a transistor including a body of semiconducting material, a base electrode, and a pair of emitter-collector electrodes connected to that body. The system also includes a first terminal circuit having high-impedance and low-impedance signal-translating channels coupled between the aforesaid base electrode and one of the aforesaid pair of electrodes. The system further includes a second terminal circuit having high-impedance and low-impedance signal-translating channels coupled between the aforesaid base electrode and the other of the aforesaid pair of electrodes. The system additionally includes an alternating current source of bias potential coupled to the circuits for supplying potentials thereto to render the transistor conductive alternately in opposite senses. The system further includes means in the channels responsive to the aforesaid potentials for selectively connecting in circuit through the transistor a high-impedance channel of the first circuit and a low-impedance channel of the second circuit in alternation with a low-impedance channel of the first circuit and a high-impedance channel of the second circuit, thereby to translate signals in two directions between the terminal circuits.

For a better understanding of the present invention, together with other and further objects thereof, reference is had to the following description taken in connection with the accompanying drawing, and its scope will be pointed out in the appended claims.

In the drawing, the single figure thereof is a circuit diagram of a system in accordance with a particular form of the invention for translating signals in two directions.

*Description of signal-translating system*

Referring now more particularly to the drawing, the system for translating signals in two directions comprises a transistor 10, which may be of the point-contact or of the junction type, including a body 11 of semiconducting material, a grounded base electrode 12 and a pair of emitter-collector electrodes 13, 14 connected to that body. The system also includes a first terminal circuit 15 having high-impedance and low-impedance signal-translating channels connected to the base electrode 12 and including in each of those channels at least a portion of a first tapped transformer secondary winding 18 and including a pair of nonlinear circuit elements, preferably crystal-rectifier devices 19 and 20, one in each channel, coupled in opposite senses or polarity to one of the pair of electrodes, namely to the emitter-collector electrode 13. The channels, which will be more fully described hereinafter, include a pair of signal transducers comprising a microphone 21 and a sound reproducer such as a loudspeaker 22, and also include a transformer 23 having a first or primary winding 24 coupled to the units 21 and 22 through respective inductors 25 and 26. The transformer 23 also includes a second winding 27, comprising the entire tapped secondary winding of the transformer, having the entire or high-impedance portion of that winding in the high-impedance channel and having a low-impedance portion 28 in the low-impedance channel. The emitter-collector electrode 13 is connected through the entire secondary winding 18 and the rectifier device 19 to the ungrounded or high-impedance terminal of the secondary winding 27. The tap of the secondary winding 27 is connected through the crystal-rectifier device 20 to the tap of the secondary winding 18. Thus, the high-impedance signal-translating channel of the terminal circuit 15 comprises the grounded base electrode 12, the secondary winding 27 of the transformer 23, the crystal-rectifier device 19, the transformer secondary winding 18, the electrode 13 and the semiconductor 11. Furthermore, the low-impedance signal-translating channel comprises the base electrode 12, the winding portion 28 of the secondary winding 27, the device 20, the portion of the winding 18 between the tap and the emitter-collector electrode 13, the electrode 13, and the semiconducting body 11.

The signal-translating system further includes a second terminal circuit 30 also having high-impedance and low-impedance signal-translating channels connected to the base electrode 12 and including in those channels a second transformer secondary winding 31 and a pair of nonlinear circuit elements 32 and 33, one in each channel, coupled in opposite senses to the other emitter-collector electrode 14. This second terminal circuit is effectively the mirror image of the first terminal circuit 15 and comprises a transformer secondary winding 34 of a transformer 37 which is connected between one terminal of the rectifier device 32 and the base electrode 12 of the transistor 10. The rectifier device 33 is connected between the taps of the windings 31 and 34. The transformer 37 has a primary winding 38 coupled to a microphone 35 and a signal reproducer or loudspeaker 36 through respective inductors 39 and 40. The high-impedance and the low-impedance channels of the terminal circuit 30 will be apparent because of the symmetry of this circuit with reference to the first terminal circuit 15.

The system for translating signals in two directions additionally includes an alternating-current source 50 of bias potential including a transformer primary winding 52 which is inductively coupled to its secondary windings 18 and 31 for supplying energy or operating potentials to the terminal circuits 15 and 30 and to the electrodes 13 and 14 to render the transistor 10 conductive alternately in opposite senses and to control the crystal-rectifier devices 19, 20, 32 and 33 so that a high-impedance channel of the first circuit 15 and a low-impedance channel of the second circuit 30 are rendered conductive in alternation with a low-impedance channel of the circuit 15 and a high-impedance channel of the circuit 30, thereby to translate signals in two directions between the transducers 21, 22, 35, and 36 of the terminal circuits. The periodic-signal source 50 may be any suitable source of alternating potential such as a vibrating reed or a suitable electronic oscillator for developing an output signal having a suitable frequency such as one which is at least twice as great as the highest frequency component of any audio-frequency signal applied to a communication system by the units 21 and 35. For example, in an audio-frequency signal-translating system the periodic-signal source may develop a frequency within the range of 30 to 100 kilocycles.

*Operation of signal-translating system*

In considering the operation of the signal-translating system, it will be assumed for the purpose of convenience of explanation that the transistor 10 is an n-type germanium point-contact transistor. During one-half cycle when the instantaneous value of the alternating potential applied to the terminal of the primary winding 52 associated with the secondary winding 18 is positive, the instantaneous value of the signal applied to the electrode 13 is positive so that it may momentarily function as an emitter electrode. At the same moment the instantaneous value of the potential appearing at the terminal of the secondary winding 18 connected to the cathode of the crystal-rectifier device 20 is negative. This momentarily causes the device to conduct and thereby complete a circuit between the electrode 13 and the base electrode 12 through a portion of the winding 18, the rectifier device just mentioned, and the low-impedance portion 28 of the winding 27. However, the polarity of connection of the rectifier device 19 is such that it momentarily remains nonconductive.

At the same instant presently under consideration, the instantaneous value of the alternating potential applied to the terminal of the primary winding 52 associated with the secondary winding 31 is negative and the instantaneous value of potential applied to the electrode 14 of the transistor 10 is negative so that the electrode 14 is momentarily energized in a sense to act as a collector electrode. At the instant still under consideration, the secondary winding 31 applies an instantaneous value of anode potential to the positive terminal of the rectifier device 32, thus rendering it momentarily conductive to complete a circuit between the electrode 14 and the base electrode 12 through the winding 31, the rectifier device just mentioned, and the entire high-impedance secondary winding 34. The polarity of connection of the rectifier device 33 is such that it momentarily remains nonconductive.

For the instantaneous conditions just described, electrons will be drawn from the semiconducting body 11 into the electrode 13, which is then serving as an emitter electrode, and holes from the portion of the body 11 near the emitter electrode will be attracted by the negative field of the electrode 14 to a region in the vicinity of that electrode which is then functioning as a collector electrode. Thus, both the emitter electrode 13 and the collector electrode 14 simultaneously draw current at the instant under consideration. Let it now be assumed that an operator at the terminal station 15 is speaking into the microphone 21 and that another operator at the terminal 30 is listening to the sound from the loudspeaker 36. The microphone 21 and the described conductive portion of the input circuit of the transistor 10 are effective to apply between the electrodes 13 and 12 an audio-frequency signal, the instantaneous value of which produces a related but amplified change in the instantaneous current flow between the collector electrode 14 and the base electrode 12. The instantaneous value of the collector-electrode or output current flowing through the transformer 37 is translated by the latter and applied to the loudspeaker 36.

During the succeeding half cycle when the instantaneous value of the alternating potential applied to the terminal of the primary winding 52 associated with the secondary winding 18 is negative, the instantaneous value of the signal applied to the electrode 13 is negative so that it may momentarily function as a collector electrode. The instantaneous potential then appearing at the terminal of the secondary winding 18 connected to the rectifier device 19 is positive so that the device is rendered conductive at that instant. The device 20 is so poled that it is unaffected at that instant by the potential applied to it by the winding 18. When the rectifier device 19 is momentarily rendered conductive at the instant now under consideration, the high-impedance path between the electrode 13 and the base electrode 12 is completed so that collector-electrode current may flow therein. At this same instant the secondary winding 31 applies a positive polarity instantaneous potential to the electrode 14, thus permitting it to function momentarily as an emitter electrode. The instantaneous value of the potential applied by the terminal of the winding 31 remote from the electrode 14 to the rectifier device 32 is then negative. The polarity of that device is such that it cannot then be conductive. However, the oppositely poled device 33 is rendered conductive, thus momentarily completing through the winding portion 41 the low-impedance path between the electrodes 14 and 12. Under the assumed condition, the signal-translating system is momentarily in a condition to translate an audio-frequency signal from the terminal station 30 to the other terminal station 15.

During the next half cycle, the signal developed by the source 50 is applied with positive polarity to the electrode 13 and the terminal station 15 is then so energized that its low-impedance channel is again operative. Simultaneously, the terminal 14 has an instantaneous negative voltage thereon and the high-impedance channel of the terminal station 30 is so energized that it momentarily is conditioned to translate to the loudspeaker 36 the audio-frequency signal applied to the low-impedance input circuit of the terminal station 15 by the microphone 21. A moment later the energization of the signal-translating paths of the terminal stations 15 and 30 is altered as previously explained. This alternation process continues for successive half cycles of the potential developed by the unit 50 and, over a period of many such cycles, the audio-frequency information developed by the microphone 21 at the terminal station 15 is translated during alternate half cycles of the signal from unit 50 to the loudspeaker 36 at the terminal station 30 where it is converted to sound.

It will now be assumed that the operator at the terminal station 30 is to do the speaking while the operator at the terminal station 15 will listen. In a manner similar to that explained in connection with the translation of audio-frequency signals from the station 15 to the station 30, the alternate reversal of the operation of the electrodes 13 and 14 as emitter and collector electrodes and also the alternate switching of the high-impedance paths and the low-impedance paths of the terminal stations cause audio-frequency information to be transmitted with power gain from the station 30 to the station 15 during half cycles of the signal from source 51 intervening those in which audio-frequency signals may be transmitted in the opposite direction. Thus the single transistor 10 serves as a three-terminal amplifier element and translates signals in two directions therethrough between the stations 15 and 30. The periodic-signal source 50 is effective during this operation to supply operating potentials of the proper polarity to the transistor to permit this two-way operation and to control the rectifier devices 19, 20, 32, and 33 in such a manner that a low-impedance path exists in any emitter-electrode or input circuit and a high-impedance path appears in any collector-electrode or output circuit thus assuring greatest gain and best performance from the transistor and its circuits.

When a transistor is employed in the described signal-translating circuit and has been subjected to a forming operation on one of its electrodes other than the base electrode, the current gain presented by the transistor may be greater in one direction than the other. For some applications these unequal gains may not be objectionable and, in fact, may be desirable. The described signal-translating circuit may employ point-contact transistors in which the forming operation has been omitted, thus causing the system to afford comparable gains in the two directions. As previously mentioned, other types of transistors such as the junction type may be employed in the described system and the operation is similar to that explained above.

From the foregoing description, it will be clear that a two-way signal-translating system in accordance with the invention is economical of power, requires no push-button controls, and is effective, because of the establishment of circuits having preferred impedance relationships, to provide an efficient transfer of energy between the input and output portions of the system.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A system for translating signals in two directions comprising: a transistor including a body of semiconducting material, a base electrode and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes; a second terminal circuit having high-impedance and low-impedance signal-translating channels and including a pair of nonlinear circuit elements, one in each of said last-mentioned channels, oppositely poled and coupled between said base electrode and the other of said pair of electrodes; and an alternating-current source of bias potential coupled to said circuits for supplying potentials thereto to render said transistor conductive alternately in opposite senses and to control said elements so that a high-impedance channel of said first circuit and a low-impedance channel of said second circuit are selected in alternation with a low-impedance channel of said first circuit and a high-impedance channel of said second circuit, thereby to translate signals in two directions between said terminal circuits.

2. A system for translating signals in two directions comprising: a transistor including a body of semiconducting material, a base electrode and a pair of emitter-collector electrodes connected to said body; a first terminal circuit having high-impedance and low-impedance signal-translating channels coupled between said base electrode and one of said pair of electrodes; a second terminal circuit having high-impedance and low-impedance signal-translating channels coupled between said base electrode and the other of said pair of electrodes; an alternating-current source of bias potential coupled to said circuits for supplying potentials thereto to render said transistor conductive alternately in opposite senses; and means in said channels responsive to said potentials for selectively connecting in circuit through said transistor a high-impedance channel of said first circuit and a low-impedance channel of said second circuit in alternation with a low-impedance channel of said first circuit and a high-impedance channel of said second circuit, thereby to translate signals in two directions between said terminal circuits.

3. A system for translating signals in two directions comprising: a transistor of the point-contact type including a body of semiconducting material, a base electrode and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes; a second terminal circuit having high-impedance and low-impedance signal-translating channels and including a pair of nonlinear circuit elements, one in each of said last-mentioned channels, oppositely poled and coupled between said base electrode and the other of said pair of electrodes; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said terminal circuits.

4. A system for translating signals in two directions comprising: a transistor of the junction type including a body of semiconducting material, a base electrode and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes; a second terminal circuit having high-impedance and low-impedance signal-translating channels and including a pair of nonlinear circuit elements, one in each of said last-mentioned channels, oppositely poled and coupled between said base electrode and the other of said pair of electrodes; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said terminal circuits.

5. A system for translating signals in two directions comprising: a transistor including a body of semiconducting material, a base electrode and a pair of emitter-collector electrodes connected to said body; a first terminal circuit having high-impedance and low-impedance signal-translating channels and including a pair of crystal rectifier elements, one in each channel, oppositely poled and coupled between said base electrode and one of said pair of electrodes; a second terminal circuit having high-impedance and low-impedance signal-translating channels and including a pair of crystal-rectifier elements, one in each of said last-mentioned channels, oppositely poled and coupled between said base electrode and the other of said pair of electrodes; and an alternating-current source of bias potential coupled to said circuits for supplying potentials thereto to render said transistor conductive alternately in opposite senses and to control the conductivity of said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said terminal circuits.

6. A system for translating signals in two directions comprising: a transistor including a body of semiconducting material, a base electrode and a pair of emitter-collector electrodes connected to said body; a first terminal circuit having high-impedance and low-impedance signal-translating channels and including an inductor, and a pair of nonlinear circuit elements, one in each channel, oppositely poled and coupled between said base electrode and one of said pair of electrodes; a second terminal circuit having high-impedance and low-impedance signal-translating channels and including an inductor, and a pair of nonlinear circuit elements, one in each of said last-mentioned channels, oppositely poled and coupled between said base electrode and the other of said pair of electrodes; and an alternating-current source of bias potential inductively coupled to said inductors for supplying alternating potentials to said circuits with such polarity as to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said terminal circuits.

7. A system for translating signals in two directions comprising: a transistor including a body of semiconducting material, a base electrode and a pair of emitter-collector electrodes connected to said body; a first terminal circuit having high-impedance and low-impedance signal-translating channels and including in said channels at least a portion of a first transformer secondary winding and a pair of nonlinear circuit elements, one in each channel, oppositely poled and coupled between said base electrode and one of said pair of electrodes; a second terminal circuit having high-impedance and low-impedance signal-translating channels and including in said last-mentioned channels a second transformer secondary winding and a pair of nonlinear circuit elements, one in each of said last-mentioned channels, oppositely poled and coupled between said base electrode and the other of said pair of electrodes; and an alternating-current source of bias potential including a transformer primary winding coupled to said secondary windings for supplying potentials to said circuits to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said terminal circuits.

8. A system for translating signals in two directions comprising: a transistor including a body of semiconducting material, a base electrode and a pair of emitter-collector electrodes connected to said body; a first terminal circuit having high-impedance and low-impedance signal-translating channels and including a signal generator coupled to said channels and including a pair of nonlinear circuit elements, one in each channel, oppositely poled and coupled between said base electrode and one of said pair of electrodes; a second terminal circuit having high-impedance and low-impedance signal-translating channels and including a signal generator coupled to said last-mentioned channels and including a pair of nonlinear circuit elements, one in each of said last-mentioned channels, oppositely poled and coupled between said base electrode and the other of said pair of electrodes; and an alternating-current source of bias potential coupled to said circuits for supplying potentials thereto having a frequency at least twice as great as the highest frequency component of signals developed by said generators to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby alternately to translate a signal developed by one of said generators in one direction through said transistor and a signal developed by the other of said generators in another direction through said transistor.

9. A system for translating signals in two directions comprising: a transistor including a body of semiconducting material, a base electrode and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes; a second terminal circuit having high-impedance and low-impedance signal-translating channels and including a pair of nonlinear circuit elements, one in each of said last-mentioned channels, oppositely poled and coupled between said base electrode and the other of said pair of electrodes; signal transducers coupled to said channels of said circuits; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said transducers.

10. A system for translating signals in two directions comprising: a transistor including a body of semiconducting material, a base electrode, and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes, said channels including a signal transducer and a transformer having a first winding coupled to said transducer and having a second winding with terminals coupled to said base electrode and one of said elements and an intermediate terminal coupled to the other of said elements; a second terminal circuit having high-impedance and low-impedance signal-translating channels and including a pair of nonlinear circuit elements, one in each of said last-mentioned channels, oppositely poled and coupled between said base electrode and the other of said pair of electrodes, said last-mentioned channels including a signal transducer and a transformer having one winding coupled to said last-mentioned transducer and having a second winding with terminals coupled to said base electrode and one of said last-mentioned elements and an intermediate terminal coupled to the other of said last-mentioned elements; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said transducers.

11. A system for translating signals in two directions comprising: a transistor including a body of semiconducting material, a base electrode, and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes, said channels including a signal transducer and a transformer having a first winding coupled to said transducer and a second winding having a high-impedance portion coupled to said base electrode and one of said elements and having a low-impedance portion coupled to said base electrode and the other of said elements; a second terminal circuit having high-impedance and low-impedance signal-translating channels and including a pair of nonlinear circuit elements, one in each of said last-mentioned channels, oppositely poled and coupled between said base electrode and the other of said pair of electrodes, said last-mentioned channels including a signal transducer and a transformer having one winding coupled to said last-mentioned transducer and a second winding having a high-impedance portion coupled to said base electrode and one of said last-mentioned elements and having a low-impedance portion coupled to said base electrode and the other of said last-mentioned elements; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said transducers.

12. A system for translating signals in two directions comprising: a transistor including a body of semiconducting material, a base electrode, and a pair of emitter-collector electrodes connected to said body; a first terminal circuit having high-impedance and low-impedance signal-translating channels and including a pair of nonlinear circuit elements, one in each channel, oppositely poled and coupled between said base electrode and one of said pair of electrodes, said channels including a signal transducer and a transformer having a first winding coupled to said transducer and a second winding having a high-impedance portion in said high-impedance channel and having a low-impedance portion in said low-impedance channel; a second terminal circuit having high-impedance and low-impedance signal-translating channels and including a pair of nonlinear circuit elements, one in each of said last-mentioned channels, oppositely poled and coupled between said base electrode and the other of said pair of electrodes, said last-mentioned channels including a signal transducer and a transformer having one winding coupled to said last-mentioned transducer and a second winding having a high-impedance portion in said last-mentioned high-impedance channel and having a low-impedance portion in said last-mentioned low-impedance channel; and an alternating-current source of bias potential coupled to said circuits for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said transducers.

13. A system for translating signals in two directions comprising: a transistor including a body of semiconducting material, a base electrode, and a pair of emitter-collector electrodes connected to said body, a first terminal circuit having high-impedance and low-impedance signal-translating channels and including at least a portion of a first transformer secondary winding and a pair of nonlinear circuit elements, one in each channel, oppositely poled and coupled between said base electrode and one of said pair of electrodes, said channels including a signal transducer and a transformer having a first winding coupled to said transducer and having a second winding connected through one of said elements and said first secondary winding to one of said pair of electrodes and having a portion of said second winding connected through the other of said elements and a portion of said first secondary winding to said one of said pair of electrodes; a second terminal circuit having high-impedance and low-impedance signal-translating channels and including a second transformer secondary winding and a pair of nonlinear circuit elements, one in each of said last-mentioned channels, oppositely poled and coupled between said base electrode and the other of said pair of electrodes, said last-mentioned channels including a signal transducer and a transformer having one winding coupled to said last-mentioned transducer and a second winding connected through one of said last-mentioned elements and said second secondary winding to the other of said pair of electrodes and having a portion of said last-mentioned second winding connected through the other of said last-mentioned elements and a portion of said second secondary winding to said other of said pair of electrodes; and an alternating-current source of bias potential including a transformer primary winding coupled to said secondary winding for supplying potentials thereto to render said transistor conductive alternately in opposite senses and to control said elements so that a high-impedance channel of said first circuit and a low-impedance channel of said second circuit are rendered conductive in alternation with a low-impedance channel of said first circuit and a high-impedance channel of said second circuit, thereby to translate signals in two directions between said transducers.

References Cited in the file of this patent

UNITED STATES PATENTS

| Number | Name | Date |
|---|---|---|
| 2,021,638 | Ramlau | Nov. 19, 1935 |
| 2,486,776 | Barney | Nov. 1, 1949 |
| 2,585,078 | Barney | Feb. 12, 1952 |